United States Patent [19]

Drent et al.

[11] Patent Number: 5,049,650

[45] Date of Patent: Sep. 17, 1991

[54] POLYMERIZATION OF CO/NON-CONJUGATED DIENE/DIOL

[75] Inventors: Eit Drent; Anthonius J. M. Breed, both of Amsterdam, Netherlands

[73] Assignee: Shell Oil Company, Houston, Tex.

[21] Appl. No.: 451,918

[22] Filed: Dec. 18, 1989

[30] Foreign Application Priority Data

Dec. 29, 1988 [GB] United Kingdom ................ 8830333

[51] Int. Cl.$^5$ ............................................. C08G 67/02
[52] U.S. Cl. ..................................... 528/392; 528/271
[58] Field of Search .......................................... 528/392

[56] References Cited

U.S. PATENT DOCUMENTS

| | | | |
|---|---|---|---|
| 4,124,617 | 11/1978 | Knifton | 260/410 |
| 4,297,418 | 10/1981 | Arnold et al. | 428/595 |
| 4,297,481 | 10/1981 | Jachimowicz | 529/392 |
| 4,629,807 | 12/1986 | Knifton | 560/204 |
| 4,831,113 | 5/1989 | Van Broekhoven et al. | 528/392 |
| 4,921,937 | 5/1990 | Drent | 528/392 |
| 4,940,775 | 7/1990 | Drent | 528/392 |

Primary Examiner—Harold D. Anderson

[57] ABSTRACT

Polyesters or polyanhydrides are produced by reaction of non-conjugated dienes with diols or dicarboxylic acids, respectively, in the presence of a catalyst composition formed from a palladium compound, a monodentate phosphorus ligand optionally employed with a bidentate phosphorus ligand and a limited amount of a protonic acid having a pKa below 2, in the substantial absence of water. The polymer products are useful as constituents of sealants, adhesives and paints.

10 Claims, No Drawings

POLYMERIZATION OF CO/NON-CONJUGATED DIENE/DIOL

FIELD OF THE INVENTION

This invention relates to the production of polyesters orpolyanhydrides by reacting non-conjugated dienes with carbon monoxide and a diol or dicarboxylic acid, respectively, in the presence of a catalyst composition formed from a palladium compound, a monodentate phosphorus ligand optionally employed with a bidentate phosphorus ligand and a specified amount of protonic acid of pKa less than 2, relative to the total phosphine, in the substantial absence of water.

BACKGROUND OF THE INVENTION

The reaction of carbon monoxide with non-conjugated dienes in the presence of a transition metal catalyst Is broadly known in the art. U.S. Pat. No. 4,629,807 relates to production of esters of dicarboxylic acids by reaction of an alkadiene or an alkyne with carbon monoxide and a monohydric alcohol in the presence of, inter alia, a palladium-phosphine complex. U.S. Pat. No. 4,124,617 relates to production of monomeric fatty acids or esters thereof by reacting dienes and hydroxylated co-reactants in the presence of a catalyst formed from a palladium salt, a tertiary phosphorus-containing ligand and a tertiary nitrogen base.

The process of U.S. Pat. No. 4,297,481 relates to the production of a polymeric polyamine/amide containing the nitrogen atoms in the polymeric chain by reaction of dienes with water, a nitrogen compound of at least two active hydrogens and carbon monoxide in the presence of a rhodium-containing catalyst. It would be of advantage to provide such a process for the production of polyesters or polyanhydrides.

SUMMARY OF THE INVENTION

The process of the present invention provides a method for the production of polymeric polyesters or polyanhydrides by reaction of non-conjugated diene with a diol or a dicarboxylic acid in the presence of a palladium-containing catalyst composition. More particularly, the present invention provides for such a process in the presence of a catalyst composition formed from a palladium salt, a monodentate phosphorus ligand optionally employed with a bidentate phosphorus ligand and a specified amount, relative to total phosphine, of a protonic acid having a pKa below 2, in the substantial absence of water.

DESCRIPTION OF THE INVENTION

The present invention is a process of producing polymeric materials having ester or anhydride functionality in the polymer chain by reaction of a non-conjugated diene with carbon monoxide and a diol or a dicarboxylic acid, respectively, in the substantial absence of water but in the presence of a catalyst composition formed from a palladium compound, a monodentate phosphorus ligand optionally employed with a bidentate phosphorus ligand and up to 1 mole per mole of total phosphine of a protic acid having a pKa below 2. The product polyesters or polyanhydrides have units of a predominantly linear structure.

The non-conjugated diene reactant is a diene compound of up to 20 carbon atoms inclusive, preferably up to 10 carbon atoms inclusive, containing two ethylenic linkages which are not conjugated and which are connected by an aliphatic or aromatic linking group. The ethylenic linkages are present in open-chain or acyclic structures or one or both ethylenic linkages are present as a portion of an aliphatic ring. The diene compound is hydrocarbyl containing only atoms of carbon and hydrogen or is substituted hydrocarbyl containing additional atoms in the form of inert substituents such as halo or alkoxy. However, each carbon atom of each ethylenic linkage should have at least one hydrogen substituent. Divinylbenzene is representative of non-conjugated dienes having an aromatic moiety linking the ethylenic groups and dienes incorporating a cycloaliphatic moiety are illustrated by 1,4-cyclohexadiene, 1,4-cyclooctadiene, dicyclopentadiene, norbornadiene and vinylcyclohexene. The preferred non-conjugated dienes for use as reactant in the process of the invention are acyclic alkadienes such as 1,4-pentadiene, 1,4-hexadiene and 1,8-dodecadiene. Particularly preferred are such dienes having two terminal ethylenic linkages. These alpha,omega-dienes are represented by he formula

$$H_2C=CH\text{-}(CH_2)_nCH=CH_2 \tag{I}$$

wherein n is an integer from 1 to 16, inclusive. Exemplary dienes of formula I are 1,5-hexadiene, 1,6-heptadiene, 1,7-octadiene, 1,9-decadiene, 1,19-eicosadiene and 1,13-tetradecadiene.

The diol reactant of one embodiment of the process of the invention has up to 20 carbon atoms inclusive, preferably up to 10 carbon atoms inclusive, and two hydroxyl substituents which independently are primary or secondary. The diol is aliphatic or cycloaliphatic in character and is hydrocarbyl or substituted hydrocarbyl containing alkoxy or halo substituents. Suitable cyclic diols include 1,3-cyclohexanediol, 1,4-cyclooctanediol and hydroquinone. The preferred diols are acyclic diols such as ethylene glycol, trimethylene glycol, 1,2-butanediol, 1,4-butanediol and 1,6-hexanediol.

The dicarboxylic acids employed as reactant in the alternate embodiment of the process of the invention are aliphatic or cycloaliphatic dicarboxylic acids of up to 20 carbon atoms inclusive, preferably up to 10 carbon atoms inclusive. Illustrative of cycloaliphatic dicarboxylic acids are 1,3-cyclohexanedicarboxylic acid, 1,3-cyclooctanedicarboxylic acid and 1,2-dicarboxynorbornene. The preferred dicarboxylic acids, however, are acyclic aliphatic dicarboxylic acids such as oxalic acid, succinic acid, glutaric acid, adipic acid, suberic acid, azelaic acid and sebacic acid.

In the process of the invention, the non-conjugated diene and diol or dicarboxylic acid are contacted in the substantial absence of water in the presence of a catalyst composition formed from a palladium compound, a monodentate phosphorus ligand optionally employed with a bidentate phosphorus ligand and up to 1 mol per mol of total phosphine of a protonic acid having a pKa less than 2 (measured in water at 18° C.). The palladium compound employed as a precursor of the catalyst composition is an inorganic or organic compound of palladium. The preferred palladium compounds are palladium salts. Although palladium salts of inorganic acids, e.g., palladium nitrate or palladium sulfate are useful in the formation of the catalyst composition, better results are obtained if the palladium is provided as a palladium carboxylate such as palladium formate, palladium acetate or palladium propionate. Palladium acetate is especially preferred.

The monodentate phosphorus ligand is suitably a primary or secondary monophosphine of the formula $$PR_3P(R)_3 \qquad (II)$$

wherein R independently is aromatic of up to 20 carbon atoms inclusive. R is hydrocarbyl aromatic such as phenyl, tolyl or naphthyl or is substituted hydrocarbyl containing additional atoms in the form of electron-withdrawing groups such as nitro, halo, preferably fluoro or chloro, or trihalomethyl. When R is substituted hydrocarbyl the presence of chloro substituents is preferred and tri(p-chlorophenyl)phosphine and triphenylphosphine represent a preferred class of monodentate phosphorus ligands.

It is useful on occasion to employ a bidentate phosphorus ligand in conjunction with the monodentate phosphorus ligand. The bidentate phosphorus ligands which are most useful in the process of the invention, when bidentate ligand is employed, are tertiary bidentate ligands represented by the formula

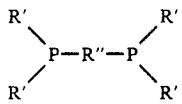

(III)

wherein R' independently is aromatic of up to 20 carbon atoms inclusive, preferably up to 10 carbon atoms inclusive. R' is preferably hydrocarbyl, e.g., phenyl, tolyl, xylyl or naphthyl. The term R' is a divalent bridging group of up to 10 carbon atoms having from 2 to 4 carbon atoms inclusive in the phosphorus-phosphorus bridge. The preferred R" groups are trimethylene and tetramethylene and 1,3-bis(diphenylphosphino)propane is particularly preferred as the bidentate phosphorus ligand. The presence of bidentate phosphorus ligand in the catalyst composition solution is not required, but whether or not the bidentate ligand is present the ratio of bidentate ligand to monodentate ligand is preferably up to 10. The moles of total phosphine is suitably in excess of the moles of palladium. The molar ratio of total phosphine to palladium should be from about 10 to about 200 but preferably is from about 15 to about 100.

The protonic acid employed as catalyst composition precursor is an oxygen-containing acid having a pKa below 2. Inorganic acids such as sulfuric acid and perchloric acid are suitable but preferred acids are organic acids including sulfonic acids such as p-toluenesulfonic acid, methanesulfonic acid and trifluoromethanesulionic acid as well as carboxylic acids such as trifluoroacetic acid, dichloroacetic acid and trichloroacetic acid. As the acid component, p-toluenesulionic acid is particularly preferred. The protonic acid is employed in a limited amount relative to the total phosphine. The molar ratio of protonic acid per mole of total phosphine should be no more than 1 but preferably is no more than 0.5.

In the polymerization mixture, the diene reactant and the diol or dicarboxylic acid reactant are contacted with carbon monoxide under polymerization conditions in the presence of the catalyst composition and a reaction diluent in the substantial absence of water. The molar ratio of diene reactant to diol or dicarboxylic acid reactant is suitably from about 5:1 to about 1:5 but preferably is substantially stoichiometric, i.e., substantially 1:1. The amount of catalyst composition to be employed is sufficient to provide from about $1 \times 10^{-7}$ mole to about $1 \times 10^{-1}$ mole per mole of diene reactant. Preferred quantities of catalyst composition provide from about $1 \times 10^{-6}$ mole to about $1 \times 10^{-3}$ mole per mol of diene reactant. The reaction diluent is an inert diluent which is liquid under the conditions of the polymerization process and which is aprotic. Suitable reaction diluents include hydrocarbons such as hexane, heptane, octane, cyclohexane, toluene and ethylbenzene, halohydrocarbons such as chloroform, chlorobenzene and methylene dichloride, sulfones such as diethylsulfone and sulfolane, N-alkalamides such as N,N-dimethylacetamide and N-methyl-2-pyrrolidone, esters such as ethyl acetate and amyl acetate and ethers including acyclic ethers such as diethyl ether, methyl t-butyl ether and diethylene glycol dimethyl ether as well as cyclic ethers such as tetrahydrofuran and dioxane. The ethers constitute a preferred class of reaction diluents. The carbon monoxide is provided as such or as a mixture with other gases such as nitrogen or a noble gas. The carbon monoxide is also suitably provided as a synthesis gas if the proportion of hydrogen is not unduly high. If the carbon monoxide is provided as a mixture with hydrogen, the proportion of hydrogen should be less than 20% by mole and preferably less than 5% by mole.

The contacting of reactants and catalyst composition is conducted by conventional methods such as shaking or stirring at polymerization conditions in a suitable reactor. Typical polymerization conditions include a reaction temperature of from about 20° C. to about 140° C. but more often from about 50° C. to about 130° C. The polymerization pressure is suitably from about 5 bar to about 200 bar but generally is from about 5 bar to about 100 bar. Subsequent to polymerization the reaction is terminated as by cooling the reactor and contents and releasing the pressure. The product is recovered by well known methods such as chromatographic separation, solvent removal or precipitation with a non-solvent followed by filtration.

The polymeric product is an alternating polymer of the diene reactant and the diol or dicarboxylic acid reactant. For purposes of illustration, employing 1,7-octadiene and 1,4-butanediol as reactants, the polyester product will be of the illustrative formulas

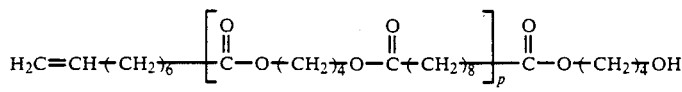

(IVa)

or

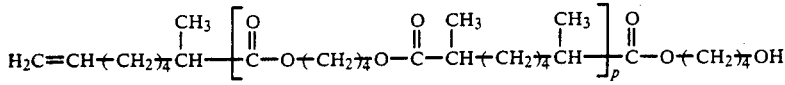

wherein the type of linkage, e.g., linear (IVa) or branched (IVb), will vary and will depend upon the geometry of the polymerization and p is an average number determined by the molecular weight of the polymer. In a similar representation, the polyanhydride product of 1,7-octadiene and adipic acid is of the representative formulas

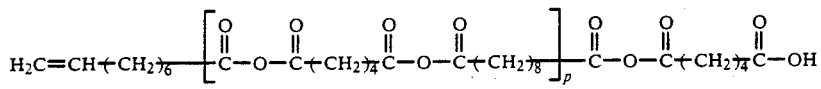

or

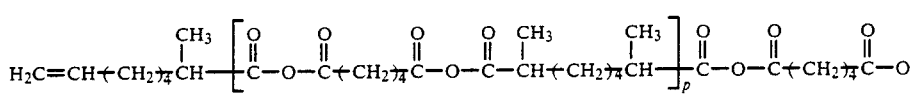

wherein the type of linkage, linear or branched, depends upon the geometry of the polymerization and p is an average number determined by the molecular weight of the polymer. Within the polymer product, linear linkages predominate by a factor of about 7 or more.

The products of the process of the invention are polyesters or polyanhydrides, depending upon the choice of diol or dicarboxylic acid, and have molecular weights from about 1000 to about 10,000, preferably from about 1000 to about 5000. The polymers are thermoplastic and are useful in applications which conventionally employ thermoplastic polymers, e.g., applications such as in viscosifiers, sealants, paints and adhesives.

The invention is further illustrated by the following Illustrative Embodiments which should not be construed to limit the invention.

ILLUSTRATIVE EMBODIMENT I

To a Hasteloy autoclave of 300 ml capacity equipped with a mechanical stirrer was charged 50 ml toluene, 55 mmol 1,10-undecadiene, 55 mmol 1,4-butanediol, 0.4 mmol palladium acetate, 8 mmol triphenylphosphine and 4 mmol p-toluenesulfonic acid. The autoclave was flushed with carbon monoxide and then pressurized with carbon monoxide until a partial pressure of 40 bar was obtained. The reactor and contents were heated to 125° C. and maintained at that temperature for 0.5 hrs. The autoclave and contents were then cooled to ambient temperature and the pressure was released. Analysis of the product mixture by gas-liquid chromatography indicated that the conversion of 1,10-undecadiene was essentially complete. The number average molecular weight of the polyester product, determined by standard nuclear magnetic resonance (NMR) techniques, was 6200 and the ratio of linear to $\alpha$-branched linkages was about 10.5:1.

ILLUSTRATIVE EMBODIMENT II

The procedure of illustrative Embodiment 1 was substantially repeated except that 50 mmol of 1,7-octadiene and 50 mmol tetraethylene glycol were used as the diene and diol reactants, and the reaction time was 1 hour. The conversion of the 1,7-octadiene was 98% and the number average molecular weight of the polyester product was about 700.

ILLUSTRATIVE EMBODIMENT III

The procedure of Illustrative Embodiment I was substantially repeated by charging to the autoclave 50 ml of toluene, 50 mmol 1,7-octadiene, 50 mmol of hydroquinone, 0.4 mmol of palladium acetate, 8 mmol of tri(p-chlorophenyl)phosphine and 4 mmol p-toluenesulfonic acid. The resulting mixture was maintained at 125° C. for 1 hour. After cooling and venting the polyester product was obtained by precipitation with methanol. The melting point of the polyester product was 110° C. and the number average molecular weight was about 1200.

ILLUSTRATIVE EMBODIMENT IV

The procedure of Illustrative Embodiment I was substantially repeated by charging to the autoclave 50 ml of toluene 55 mmol norbornadiene, 55 mmol of adipic acid, 0.4 mmol palladium acetate, 8 mmol tri(p-chlorophenyl)phosphine and 4 mmol p-toluenesulfonic acid. The reaction time at 125° C. was 2 hours. The conversion of norbornadiene was 95% and the number average molecular weight of the polyanhydride product was about 1000.

What is claimed is:

1. A process for the production of a polyester polymer by contacting carbon monoxide, a non-conjugated diene and a diol, under polymerization conditions in the substantial absence of water, in the presence of a catalyst composition formed from a palladium compound, a tertiary monodentate phosphorus ligand, optionally a tertiary bidentate phosphorus ligand, and up to 1 mol per mol of total phosphine of an oxygen containing protonic acid having a pKa below 2.

2. The process of claim 1 wherein the diene is an alpha, omegadiene represented by the formula

wherein n is an integer from 1 to 16 inclusive.

3. The process of claim 2 wherein the non-conjugated diene is contacted with carbon monoxide and an acyclic diol of up to 20 carbon atoms inclusive.

4. The process of claim 3 wherein the tertiary monodentate phosphorus ligand is represented by the formula

wherein R independently is aromatic of up to 20 carbon atoms inclusive.

5. The process of claim 4 wherein the mixture from which the catalyst composition is formed contains up to 10 mols per mol of monodentate phosphorus ligand of the bidentate phosphorus ligand represented by the formula

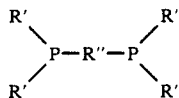

wherein R' independently is aromatic of up to 20 carbon atoms inclusive and R'' is a divalent group of up to 10 carbon atoms having 2 to 4 carbon atoms inclusive in the bridge.

6. The process of claim 5 wherein the palladium compound is a palladium carboxylate.

7. The process of claim 6 wherein the diene is 1,7-octadiene and the diol is 1,4-butanediol.

8. The process of claim 7 wherein the palladium carboxylate is palladium acetate.

9. The process of claim 8 wherein the tertiary monodentate phosphorus ligand is tri(p-chlorophenyl)phosphine and the tertiary bidentate phosphorus ligand is 1,3-bis(diphenylphosphino)propane.

10. The process of claim 9 wherein the acid is p-toluenesulfonic acid.

* * * * *